(No Model.)

J. J. ROY.
SIGNALING SAFETY VALVE.

No. 564,107.    Patented July 14, 1896.

WITNESSES:

INVENTOR
J. J. Roy
BY
ATTORNEYS.

UNITED STATES PATENT OFFICE.

JOHN J. ROY, OF LAWRENCE, MASSACHUSETTS, ASSIGNOR TO HIMSELF, ROBERT SMITH, FREDERICK SUGDEN, AND RICHARD RIGBY, OF SAME PLACE.

SIGNALING SAFETY-VALVE.

SPECIFICATION forming part of Letters Patent No. 564,107, dated July 14, 1896.

Application filed February 8, 1896. Serial No. 578,562. (No model.)

*To all whom it may concern:*

Be it known that I, JOHN J. ROY, of Lawrence, in the county of Essex and State of Massachusetts, have invented a new and Improved Safety-Valve Attachment, of which the following is a full, clear, and exact description.

The object of the invention is to provide a new and improved safety-valve attachment, which is simple and durable in construction, and arranged in such a manner that the escaping steam sounds an alarm without creating an undesirable back pressure.

The invention consists of certain parts and details and combinations of the same, as will be fully described hereinafter, and then pointed out in the claims.

Reference is to be had to the accompanying drawings forming part of this specification, in which similar characters of reference indicate corresponding parts in both the figures.

Figure 1:
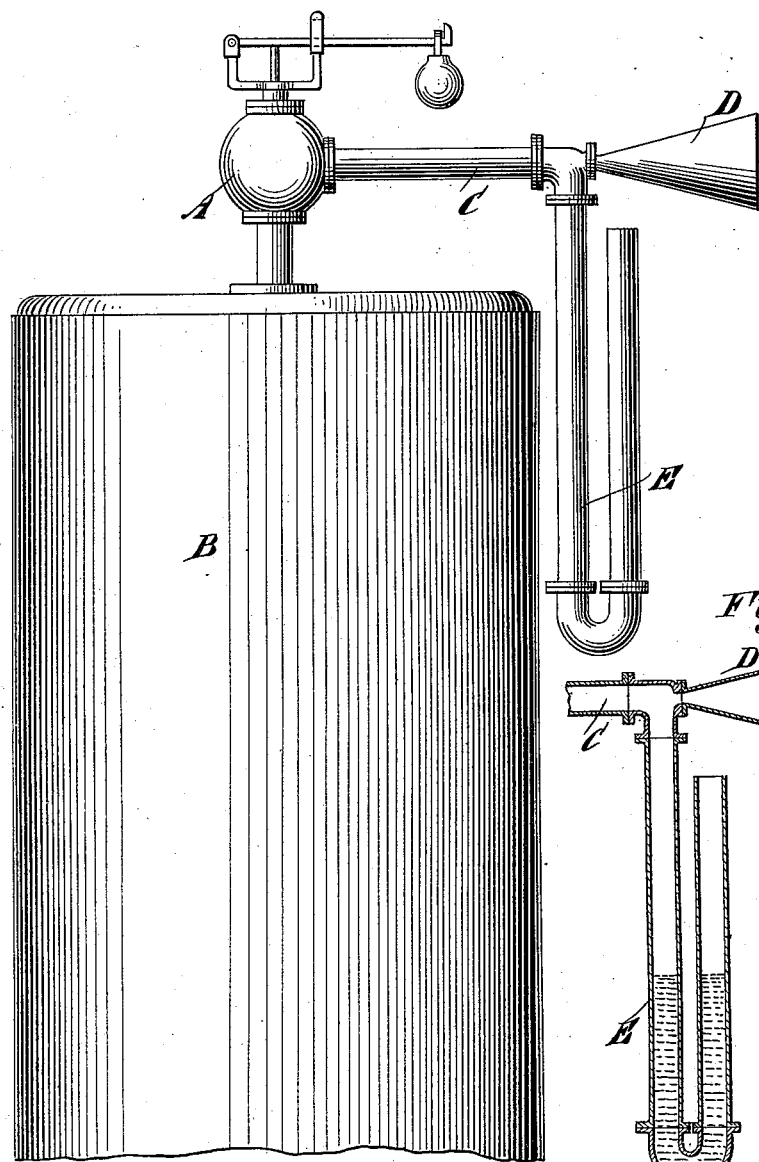
Figure 2:
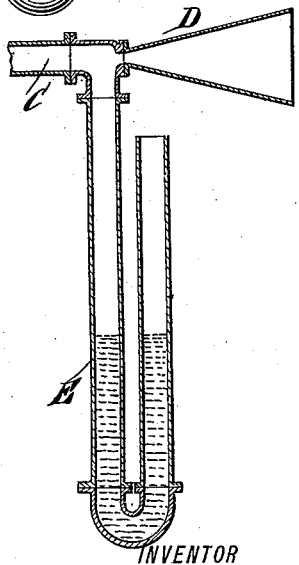

Figure 1 is a side elevation of the improvement as applied; and Fig. 2 is a sectional side elevation of the same.

The safety-valve A, of any approved construction and secured to the boiler B, is provided with an outlet-pipe C, carrying an alarm D, in the form of a horn, whistle, or like device, so that the steam passing through the safety-valve A and pipe C sounds said alarm. The pipe C terminates in a loop E, preferably made U-shaped, and adapted to contain either water of condensation from the steam passing through the pipe C, or water filled directly into the loop. The amount of water contained in the loop E must be sufficient to create a back pressure of the steam to cause the latter to sound the said alarm D, as otherwise the steam would escape through the pipe C and the loop E without sounding the alarm D. The back pressure, at most about one pound, is, however, not objectionable so far as the working of the safety-valve A is concerned, first, because the weight of the latter can be set so as to counterbalance the back pressure created by the water in the loop E; secondly, because there is no back pressure until the valve has opened.

It is understood that the only outlet for the steam passing through the safety-valve A is the pipe C, and consequently, when the steam in the boiler exceeds that of a normal pressure, the alarm D is sounded, to call the engineer's attention to the high pressure in the boiler, for the purpose of avoiding the approaching danger, that is, the water getting too low in the boiler.

It is expressly understood that the loop E contains sufficient water to send the steam through the horn D first, but should the safety-valve A open full, then the steam will blow the water out of the loop, and thereby have as free a passage as if no horn were attached.

Having thus fully described my invention, I claim as new and desire to secure by Letters Patent—

1. A boiler attachment, comprising a valved outlet, an alarm arranged in said outlet to be operated by the steam issuing from the valve, and a branch outlet located between the valve and the alarm and directly adjacent to the alarm, substantially as described.

2. A safety-valve attachment, comprising an outlet-pipe for the steam from the safety-valve, an alarm in the form of a horn, whistle or like device, and a loop extending from said pipe between the safety-valve and the horn and adapted to contain a quantity of water, to produce a sufficient back pressure of the steam to insure a sounding of said alarm, substantially as shown and described.

3. A boiler attachment, comprising a valved outlet, an alarm arranged in said outlet to be operated by the steam issuing from the valve, and a branch outlet located between the boiler and the alarm and adapted to contain a movable body for the purpose of producing a sufficient back pressure of the steam to insure a sounding of the said alarm, substantially as described.

4. A boiler attachment, comprising a valved outlet, an alarm arranged in said outlet to be operated by the steam issuing from the valve, and a branch loop connected to the outlet between the boiler and the alarm and adapted to contain a liquid for the purpose of producing sufficient back pressure of steam to insure a sounding of the alarm, substantially as described.

JOHN J. ROY.

Witnesses:
CHARLES U. BELL,
ROBERT SMITH.